(12) United States Patent
Nord

(10) Patent No.: US 7,307,859 B2
(45) Date of Patent: Dec. 11, 2007

(54) CIRCUIT FOR REDUCTION OF VOLTAGE STRESS BETWEEN WINDINGS

(76) Inventor: Jonathan P. Nord, 38 R Enon St., Apartment 214, Beverly, MA (US) 01915

( * ) Notice: Subject to any disclaimer, the term of this patent is extended or adjusted under 35 U.S.C. 154(b) by 63 days.

(21) Appl. No.: 11/163,378

(22) Filed: Oct. 17, 2005

(65) Prior Publication Data

US 2006/0083034 A1 Apr. 20, 2006

Related U.S. Application Data

(60) Provisional application No. 60/619,529, filed on Oct. 15, 2004.

(51) Int. Cl.
*H02M 7/10* (2006.01)
(52) U.S. Cl. .......................... 363/68; 363/126
(58) Field of Classification Search .................. 363/67, 363/68, 126
See application file for complete search history.

(56) References Cited

U.S. PATENT DOCUMENTS

| | | | | |
|---|---|---|---|---|
| 3,363,165 A * | 1/1968 | Wilkinson | .................... | 363/68 |
| 4,030,018 A * | 6/1977 | Tsuboi | .................... | 363/68 |
| 4,338,657 A | 7/1982 | Lisin et al. | .................... | 363/68 |
| 4,545,005 A * | 10/1985 | Mudde | .................... | 363/68 |
| 4,569,010 A * | 2/1986 | Klokkers et al. | .................... | 363/68 |
| 4,587,606 A | 5/1986 | Sanada | .................... | 363/68 |
| 4,807,105 A * | 2/1989 | Varjasi et al. | .................... | 363/68 |
| 5,003,452 A | 3/1991 | Sireul et al. | .................... | 363/61 |
| 5,023,768 A | 6/1991 | Collier | .................... | 363/68 |
| 5,060,128 A | 10/1991 | Onodera et al. | .................... | 363/20 |
| 5,166,965 A | 11/1992 | Collier | .................... | 378/101 |
| 5,835,367 A * | 11/1998 | Pan et al. | .................... | 363/61 |
| 5,991,178 A * | 11/1999 | Arnould | .................... | 363/68 |
| 6,026,004 A | 2/2000 | Cross | .................... | 363/68 |
| 6,154,382 A * | 11/2000 | Kawahara et al. | .................... | 363/68 |
| 6,654,266 B2 * | 11/2003 | Kalvelage et al. | .................... | 363/71 |

* cited by examiner

*Primary Examiner*—Jeffrey Sterrett
(74) *Attorney, Agent, or Firm*—Lafkas Patent LLC; David M. Lafkas

(57) ABSTRACT

The present invention is a high voltage power converter having primary and secondary winding sets in a single planar layer stacked in increasing voltage and arranged without the use of a conductor. Substantially no AC stress exists between winding sets.

17 Claims, 8 Drawing Sheets

CIRCUIT FOR REDUCTION OF VOLTAGE STRESS BETWEEN WINDINGS

CROSS-REFERENCE TO RELATED APPLICATION

This application for a patent claims priority to U.S. Provisional Patent Application No. 60/619,529 as filed Oct. 15, 2004.

BACKGROUND

The present invention relates to high voltage power supplies, and more particularly, to high voltage power converter circuits having substantially reduced AC voltage between secondary windings.

Many conventional high voltage DC sources rely upon inductive coupling of energy from a low voltage AC source to secondary coils which include a rectifier assembly for rectifying the AC voltage to produce a DC output. An increased output voltage level is achieved by the transformer principle. That is, the low voltage AC source is connected to a primary coil having a small number of turns and rectifying component are connected to a secondary coil having a large number of turns. The inductive coupling in the high turns ratio secondary increases or "steps-up" the voltage to the high output level.

U.S. Pat. No. 5,631,815 to Cross describes a high voltage power supply in which a high voltage DC output is generated by magnetically coupling energy from a high frequency alternating electrical source to an arrangement of rectifier modules in the output stage. Accordingly, the rectifier modules and the associated magnetic coupling operate to limit the alternating voltages produced in the secondary windings to a level below the Paschen Minimum Voltage for the medium surrounding the rectifiers. This facilitates the use of high frequency alternating voltages as the excitation source for the magnetic structure, and eliminates partial discharges which are a serious insulation problem with alternating circuits at high voltage. High frequency excitation of the magnetic structure is desirable because it reduces the size of the structure required and similarly reduces the cost.

With the addition of many low voltages, which each are less than Paschen minimum or approximately 380 Volts, it is possible to use surface mount technology to construct the rectifier stages and to use printed circuit boards as carriers for the secondary windings and rectifier stages. Advantageously, this arrangement provides a reliable and low cost assembly suitable for operation at high frequency excitation. The modular nature of the arrangement makes it is possible to stack a large number of the voltage generating printed circuit boards to provide very high voltages. Assuming that all printed circuit boards used are identical, it is economical to create very high voltages by using a large number of the voltage generating boards connected in series.

In some known power supply configurations, energy from the excitation source is provided to secondary windings and rectifiers through magnetic coupling in a magnetic circuit or core. This magnetic core is assumed to be at ground potential, and the voltage generating boards are insulated from the magnetic core. For practical purposes, such a design works well for moderately high voltages, for example, up to 200 kV. It becomes difficult and impractical to insulate secondary windings of the supply from a grounded magnetic core at higher voltages. Such issues were long ago encountered when high voltage power supplies were excited with 60 Hz oscillations. To surmount the problems, the magnetic core was segmented, and the segments were insulated from one another via a polymer layer. The segments of the magnetic core were then maintained at a voltage level similar to that of neighboring neighbouring secondaries. This became known as an Isolated Core Transformer (ICT) and was first developed Van der Graaf in the 1940's.

It is well known that even at 60 Hz, problems exist with using an ICT. This is especially true at higher currents. The problems arise out of the segmentation of the magnetic core in the transformer which introduces gaps in the magnetic structure with a permeability essentially that of air. This greatly increases the reluctance of the magnetic structure and results in increased primary current required to produce requisite secondary current. Furthermore, leakage of magnetic flux around gaps results in decreased magnetic flux coupled between primary and distant secondaries. This results in a lower generated voltage per turn on the secondary windings. The leakage flux also gives rise to leakage reactance in the equivalent circuit of the transformer. The leakage reactance produces a drop in output voltage proportional to the load current. Because of this leakage, an ICT is highly likely to exhibit a severe drop in output voltage with load current. Thus, it is difficult to design an ICT for very high voltages because of the loss of magnetic flux in the upper stages.

These inherent problems with ICTs operating at 60 Hz were addressed to an extent by winding more turns on upper secondary coils. While this approach may be suitable for conventional ICTs, it is typically undesirable for the arrangement of voltage generating printed circuit board devices using surface mount technology in the high voltage power supply.

Thus, what is desired is a single layer planar power converter circuit having a winding geometry for processing energy to and from high voltages using multiple windings operating at progressively higher voltages and without the use of a conductor between windings.

Such an approach has significant packaging advantages which make feasible secondaries in the range of approximately 30V/turn rather than nearly 200V/turn in the case of the ICT proposed by Cross. This ten fold increase in secondary turns allows drastic reduction in required magnetic cross section at the gaps and increased gap dimension to ensure reliability of inter-ferrite insulation.

SUMMARY

The various exemplary embodiments of the present invention include a device for transmitting energy, comprising at least one return vertex and at least a primary winding set and secondary winding sets. It is preferred that each winding set comprises at least one winding, at least two diode edge pairs, at least two pole vertices, at least two throw vertices, and at least two capacitors. It is preferred that each pair has a positive diode and a negative diode. Preferably, each pole vertex is positioned between the positive diode and the negative diode of each diode edge pair such that each pole vertex has a voltage that may be substantially determined via the positive diode, the negative diode, or both. Each throw vertex is preferably activated by the positive diode, the negative diode, or both to substantially determine the voltage transferred to the pole vertices. The two capacitors are each connected to one of the throw vertices. There is substantially no AC voltage between winding sets, and each winding set shares at least a throw vertex with an adjacent secondary winding set. It is also preferred that each secondary winding set closes at least a single closed path which does not include a winding of another secondary winding set, and closes at least a second closed path that includes the at least one return vertex included in the return path of another winding set. The throw vertices of a secondary winding set operate at a substantial DC bias relative to at least one of the return vertices operating at a similar DC voltage. Substantially all current related to energy transfer between primary windings and secondary windings passes through one of the return vertices.

The various exemplary embodiments of the present invention further include a method of energy transfer between at least a primary and secondary winding sets. The method includes substantially eliminating AC voltage between secondary winding sets, closing at least a first closed path within each secondary winding set that does not include another secondary winding set, sharing at least a portion of a second closed path comprising and closed by another secondary winding edge apart from the first closed path for each secondary winding set, operating a winding edge which closes the second closed path for each secondary winding set at a substantial DC bias relative to another secondary winding set sharing the second closed path and having a substantially similar DC voltage, and transferring substantially all current responsible for energy transfer between the first winding set and the secondary winding sets through the shared portion of the second closed path operating at substantially similar DC voltages.

BRIEF DESCRIPTION OF DRAWINGS

The various exemplary embodiments of the present invention, which will become more apparent as the description proceeds, are described in the following detailed description in conjunction with the accompanying drawings, in which.

DETAILED DESCRIPTION

Figure 1:
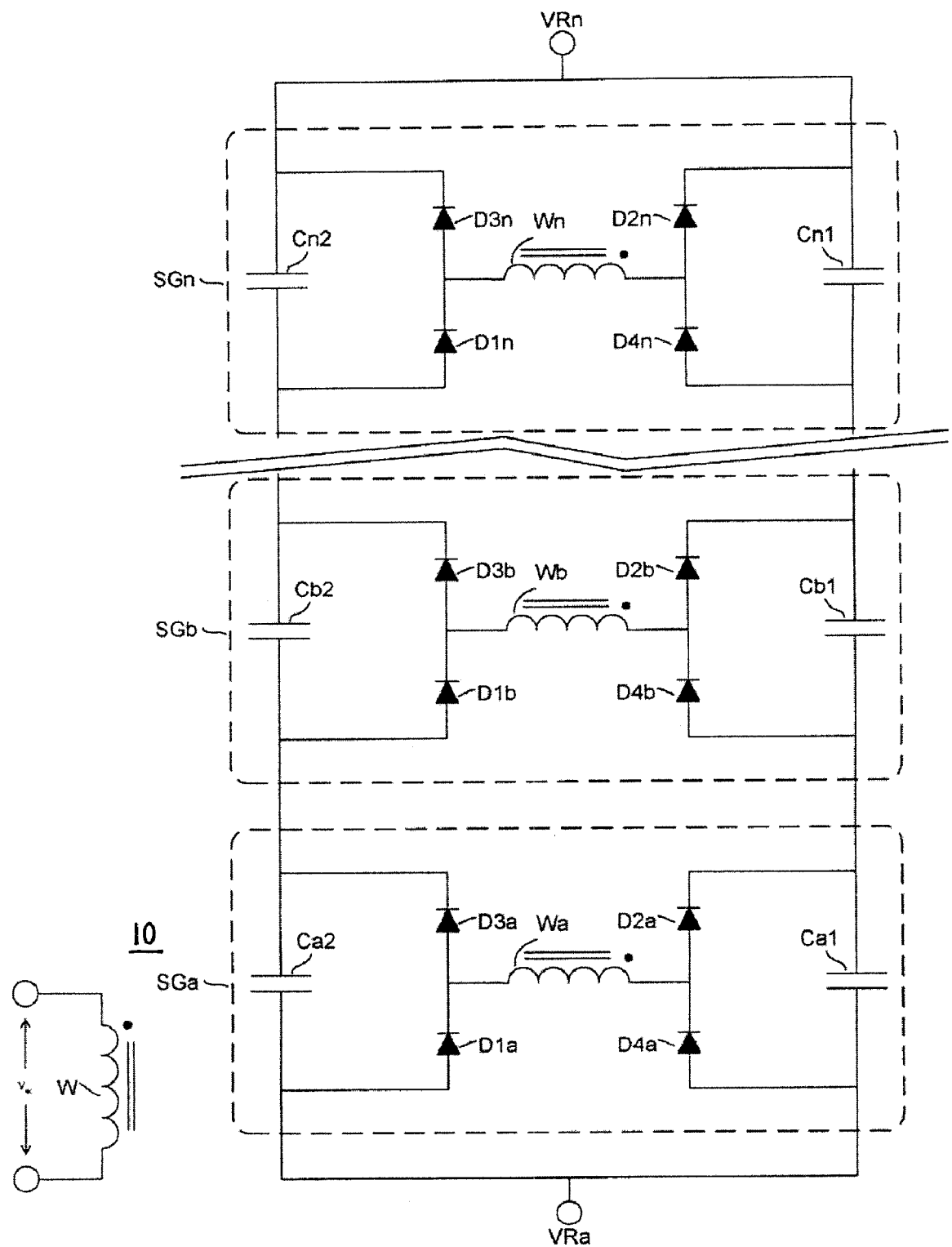
FIG. 1 is a schematic diagram of a high voltage rectifier circuit of an embodiment of the present invention.

An exemplary embodiment of the present invention, a high voltage rectifier circuit using multiple windings Wa, Wb, to Wn, is illustrated in FIG. 1.

Figure 2:
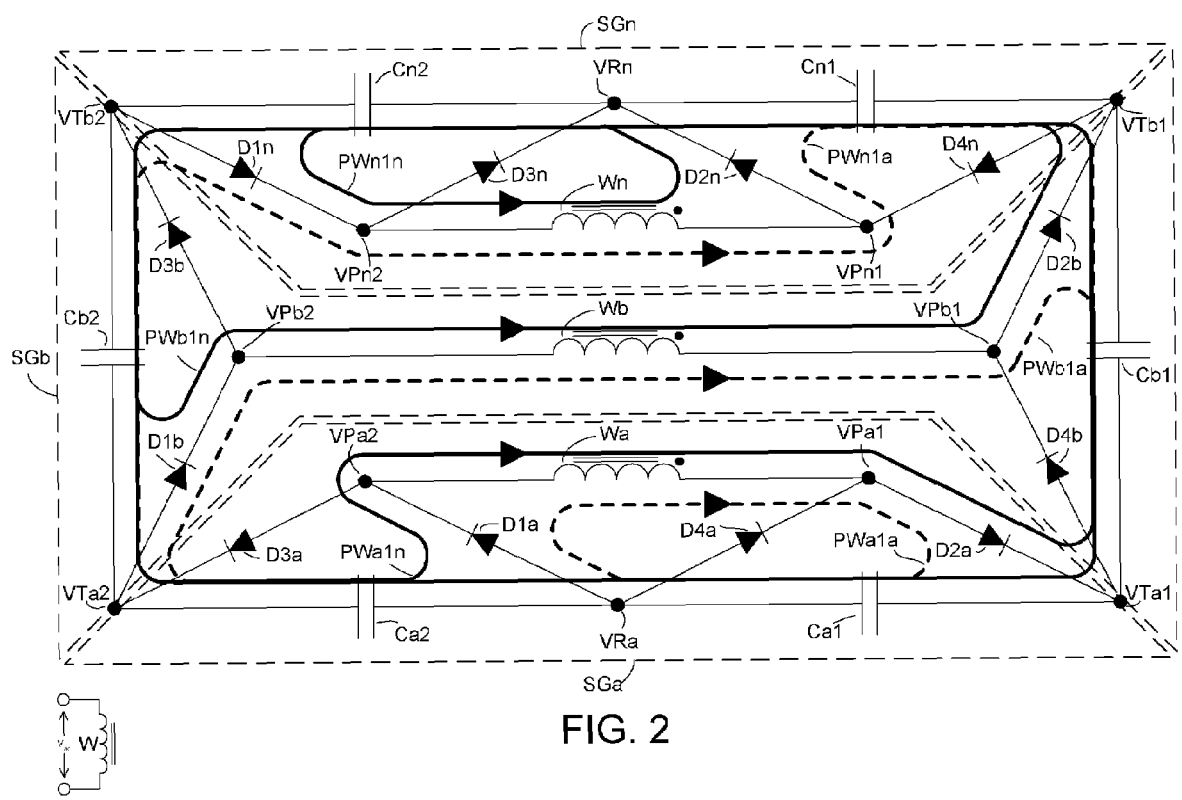
FIG. 2 is a schematic diagram showing a first mode of the embodiment of FIG. 1.

The exemplary embodiment of FIG. 1 is illustrated using graph theory techniques in FIG. 2. In the present invention, substantially no AC stress is present between the windings, Wa, Wb, to Wn. To achieve substantially no AC stress between windings, the windings are symmetrically constructed with respect to one another.

It is also preferred in exemplary embodiments of the present invention that magnetic coupling, spatial orientation, and operation of the circuit should be such that substantially no AC voltage stress exists between windings during normal operation.

Referring to FIG. 1 illustrating a device for transmitting energy 10, the preferred embodiments include that only diodes D1$a$, D1$b$, through D1$n$ & D2$a$, D2$b$, through D2$n$ conduct during a first mode. The first mode is that which is valid for positive winding current in the present invention. In a similar fashion, D3$a$, D3$b$, through D3$n$ & D4$a$, D4$b$, through D4$n$ conduct during a second mode, which is valid for negative winding current Each winding of the present invention, in conjunction with its associated diode edge pairs and capacitors, comprises winding set SGa, SGb, . . . , SGn. For instance diodes D1$b$, D2$b$, D3$b$ and D4$b$, capacitors Cb1 and Cb2 and winding Wb comprise winding set SGb.

Figure 3:
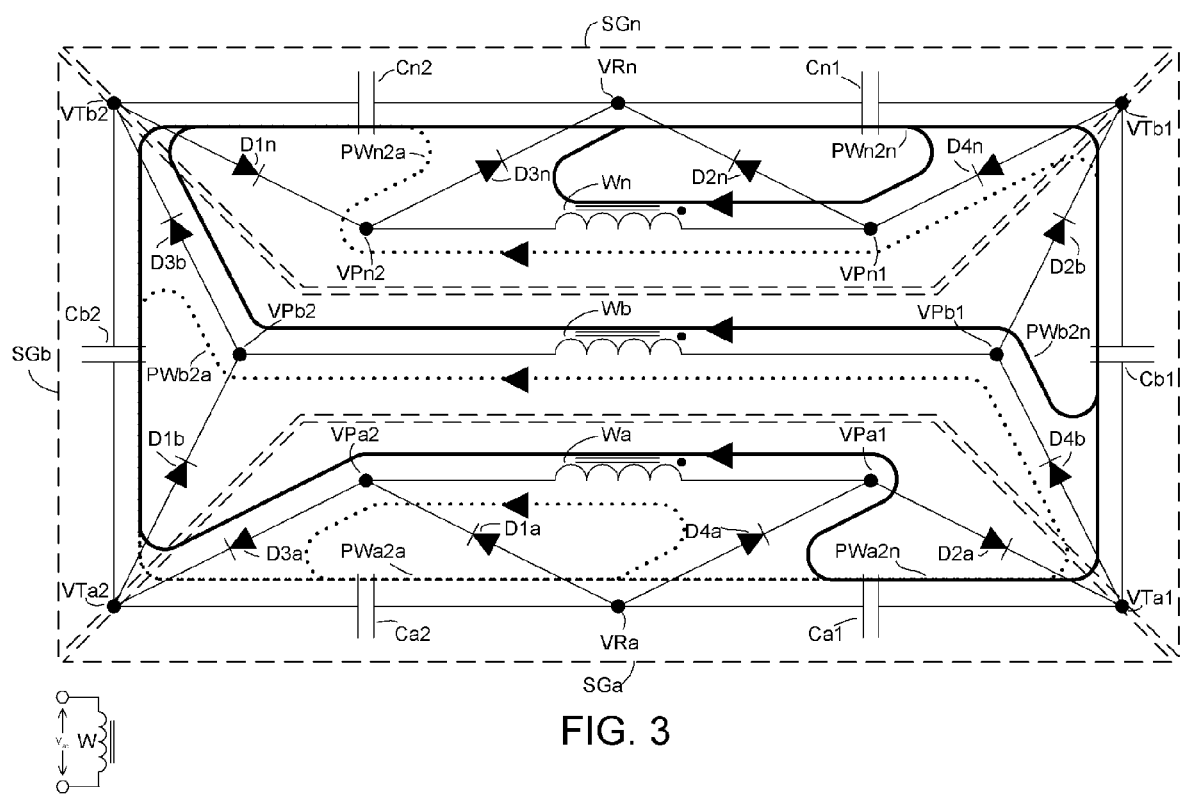
FIG. 3 is a schematic diagram showing a second mode of the embodiment of FIG. 1.

Referring to FIG. 2 and FIG. 3, within winding set SGb, for example, Wb intersects each diode edge pair, D2$b$ & D4$b$ and D1$b$ & D3$b$ at two degree 3 "pole" vertices, VPb1 and VPb2. FIG. 2 represents the first mode, and FIG. 3 represents the second mode. Owing to the existence of two return vertices, VRa and VRn, two closed paths exist for each winding during each mode. These closed paths are PWxya and PWxyn which are of the form PWxyz where x denotes the associated winding, y denotes the mode, and z denotes the associated return vertex. Thus, in reference to FIG. 2, winding set, SGb, the closed paths are PWb1$a$ and PWb2$n$. In the FIG. 3, the second mode, the closed path for the same winding set would be PWb2$a$ and PWb2$n$. Owing to both the preferred circuit topology and operation of the diodes, no valid closed path exists through more than one winding.

Each of the two closed paths associated with each winding, PWxya and PWxyn, during each mode must intersect one, and only one, of the two "throw" vertices opposite each pole vertex. For example, in FIG. 2, PWb1$a$ and PWb1$n$ both intersect throw vertices VTa2 & VTb1. In FIG. 3, PWb2$a$ and PWb2$n$ both intersect throw vertices VTa1 & VTb2. The two throw vertices opposite each pole vertex connect to capacitors, Ca1 and Ca2.

During the first mode, as represented in FIG. 2, positive winding currents flow through closed paths PWa1$a$ and PWn1$n$, charging capacitors Ca1 and Cn2 through vertices VRa and VRn respectively. In a similar fashion, in the second mode, as represented in FIG. 3, negative winding currents flow through closed paths PWa2$a$ and PWn2$n$, charging capacitors Ca2 and Cn1 through vertices VRa and VRn respectively.

The various exemplary embodiments of the present invention relate most directly to closed paths PWbyz through PW(n-1)yz which close through capacitors within adjacent stages. Owing to the location of the stage capacitors at the two throw vertices, winding currents only charge their associated stage capacitors. As stage capacitors (i.e. Cb1 and Cb2) are charged through closed paths PWx1$z$ and PWx2$z$, the return path provided by adjacent stage capacitors is equally charged and discharged.

For example, during the first mode, current in PWb1$a$ charges Ca1-Cb1 and discharges Ca2 through VRa while current in PWb1$n$ charges Cb2-Cn2 and discharges C(b+1)1-Cn1 through VRn. Similarly, during the second mode, current in PWb2$a$ charges Ca2-Cb2 and discharges Ca1 through VRa while current in PWb2$n$ charges Cb1-Cn1 and discharges C(b+1)2-Cn2 through VRn.

Figure 4:
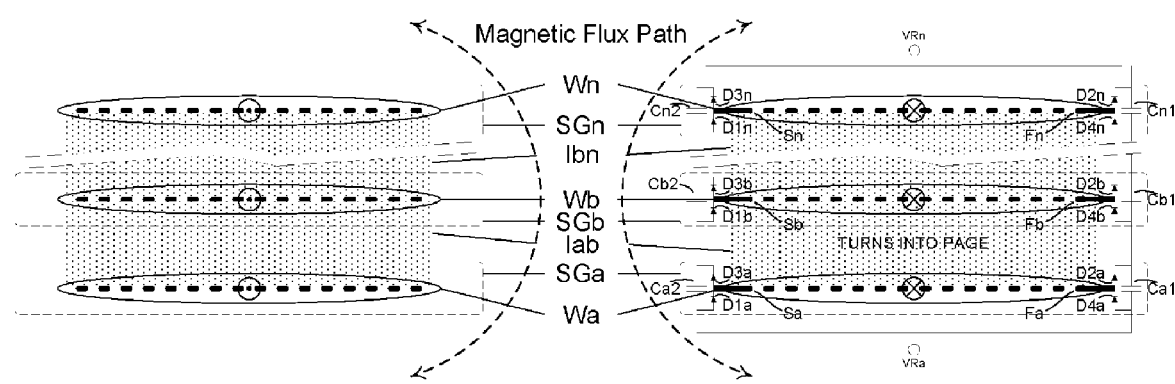
FIG. 4 illustrates a preferred geometry of the present invention.

FIG. 4 illustrates another exemplary geometry for implementation of the present invention. Windings Wa, Wb, to Wn are formed in concentric single layer planar coils wound in the same direction with starts Sa, Sb, to Sn and finishes Fa, Fb, to Fn aligned. Insulating media, Iab, ..., I(n-1)n are located between windings. This symmetric construction and orientation of windings Wa, Wb, to Wn as accomplished in this the preferred geometry makes possible substantially only DC stress between the windings. A rectifier embodiment of present invention may be arranged as illustrated in FIG. 4. This arrangement provides a natural arrangement of one planar secondary for each layer of a multilayered printed circuit board.

An array of embodiments of the present invention can be derived by development of a primitive circuit topology which ensures substantially only DC stress between the windings as well as reduction of the number of locations in which AC stress is present between windings and the return conductors carrying winding current without increasing the voltage stress between said conductors and the windings.

Figure 5:
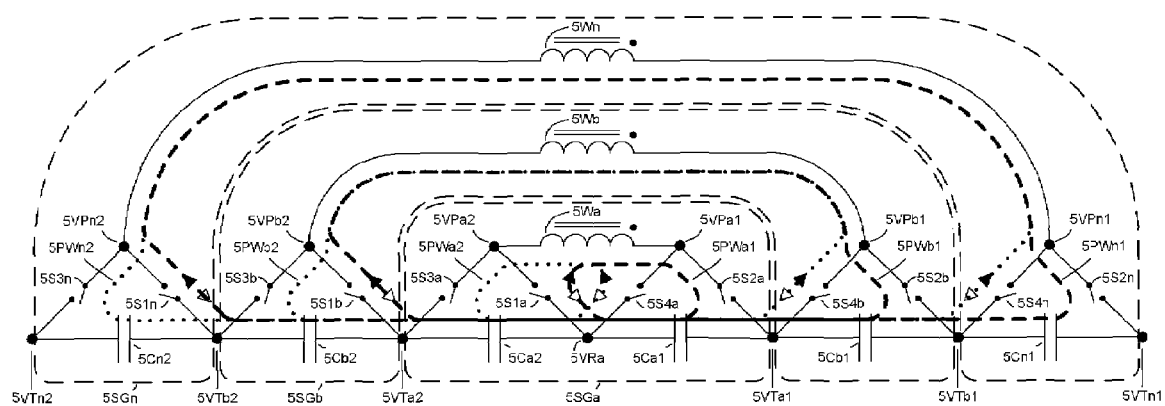
FIG. 5 is a schematic diagram of an embodiment of the present invention having only one path for winding current in each mode.
Figure 5:
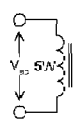

FIG. 5 illustrates another exemplary embodiment of the present invention having only one path for winding current in each mode. In this way, the exemplary embodiment is, in essence, two instances of the embodiment of FIG. 5. Furthermore, FIG. 5 illustrates the more general functionality of the present invention by using switches in the throws. Windings are formed and operated in phase with substantially only DC stress between the windings as described above. Therefore, only switches 5S1a, 5S1b, through 5S1n and 5S2a, 5S2b, through 5S2n conduct in the first mode. Meanwhile, 5S3a, 5S3b, through 5S3n & 5S4a, 5S4b, through 5S4n conduct in the second mode. Each mode provides one closed winding current path, 5PWxy, where x denotes the associated winding and y denotes the mode. Owing to both the preferred circuit topology and operation of the diodes, no valid paths exist through more than one winding.

Winding current paths, 5PWxy, in each mode do not change for opposing energy flow. Holding stage capacitor polarity positive (V(5VTa1)>V(5VRa)), energy flow is determined by current direction in each path. The filled arrow, ▶, indicates current direction for processing energy from windings 5Wa, 5Wb, through 5Wn to capacitors 5Ca1 through 5Cn1 and 5Ca2 through 5Cn2. Similarly, the unfilled arrow, ▷, indicates current direction for processing energy from capacitors 5Ca1 through 5Cn1 and 5Ca2 through 5Cn2 to windings 5Wa, 5Wb, through 5Wn. The former is possible using diodes in the switch edges, while transistors are required to perform the latter.

Reduction of the number of locations in which AC stress is present between windings and the return conductors is accomplished by routing substantially all winding return currents through 5VRa rather than through individual returns between stages, as in conventional designs. For instance, during both the first mode and the second mode, at least one edge and at least two vertices are shared by the closed paths 5PWxy.

Figure 6:
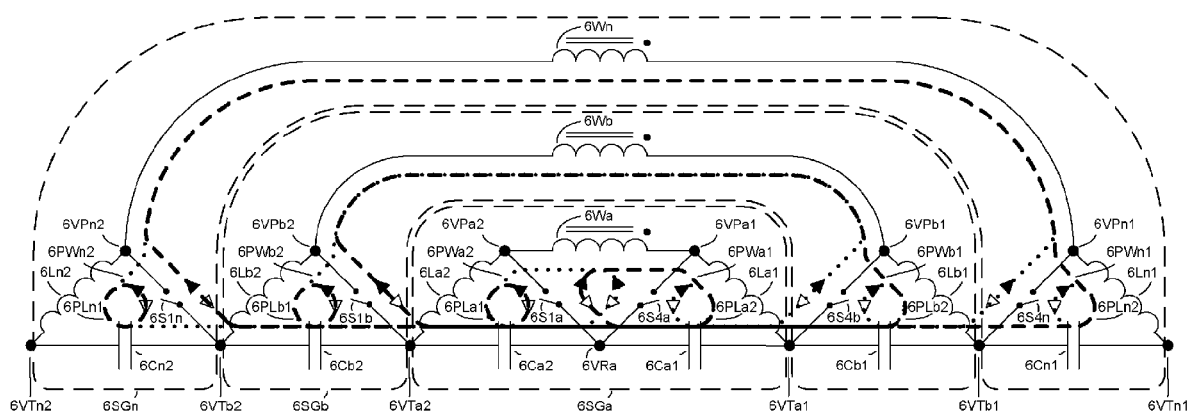
FIG. 6 is a schematic diagram of another embodiment of the present invention having only one path for winding current in each mode.
Figure 6:
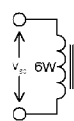

Another embodiment of the present invention, illustrated in FIG. 6, is derived from FIG. 5 by using an inductor to facilitate energy transfer between capacitors 6Ca1 through 6Cn1 and 6Ca2 through 6Cn2 and windings 6Wa, 6Wb, through 6Wn. Windings are formed and operated in phase with substantially only DC stress between the windings as described above. Therefore, only switches 6S1a, 6S1b, through 6S1n conduct in the first mode, and 6S4a, 6S4b, through 6S4n conduct in the second mode. Each mode provides one closed winding current path, 6PWxy, where x denotes the associated winding and y denotes the mode.

The pole current flowing in inductors 6Lx1 and 6Lx2 (where x denotes the associated winding) must remain continuous between modes. Therefore, when 6Wb polarity changes and 6S4b turns on in order to drive 6Lb2, current in 6Lb1 will continue to flow in the closed path, 6PLb2, formed by 6Lb1, 6Cb1 and 6S4b. Owing to both the circuit topology and operation of the windings, no valid paths exist through more than one winding.

Winding current paths, 6PWxy and 6PLxy in each mode do not change for opposing energy flow. Holding stage capacitor polarity positive (V(6VTa1)>V(6VRa)), energy flow is determined by current direction in each path. The filled arrow, ▶, indicates current direction for processing energy from windings 6Wa, 6Wb, through 6Wn to capacitors 6Ca1 through 6Cn1 and 6Ca2 through 6Cn2. Similarly, the unfilled arrow, ▷, indicates current direction for processing energy from capacitors 6Ca1 through 6Cn1 and 6Ca2 through 6Cn2 to windings 6Wa, 6Wb, through 6Wn. The former is possible using diodes in the switch edges, while transistors are required to perform the latter.

Reduction of the number of locations in which AC stress is present between windings and the return conductors is accomplished by routing substantially all winding return currents through 6VRa rather than through individual returns between stages, as in conventional designs. For instance, during both the first mode and the second mode, at least one edge and at least two vertices are shared by the closed paths 6PWxy.

Figure 7:
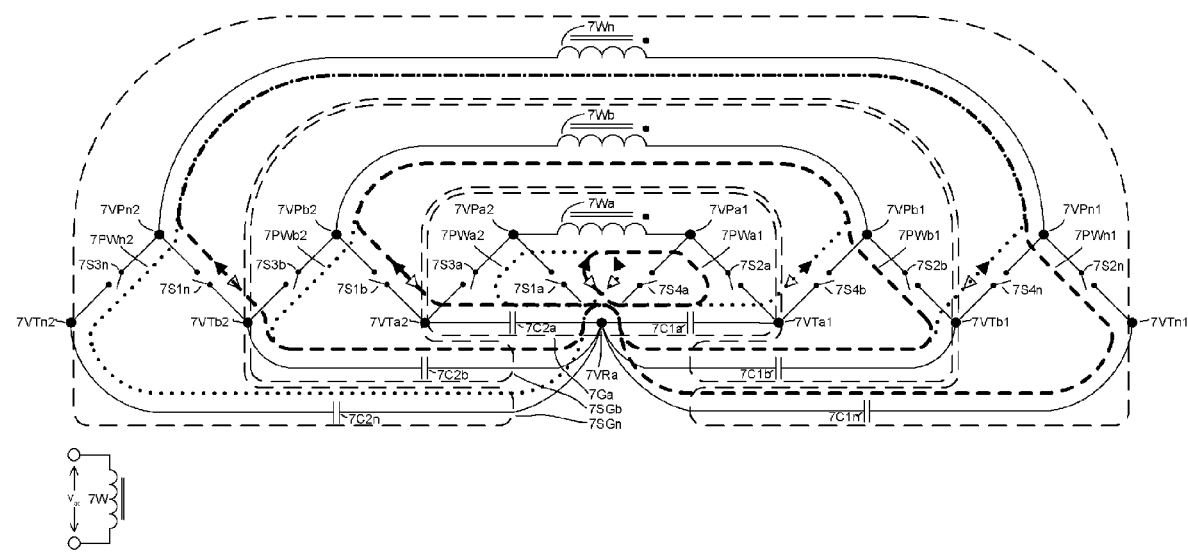
FIG. 7 is yet another a schematic diagram of another embodiment of the present invention having only one path for winding current in each mode.

Yet another exemplary embodiment of the present invention, illustrated in FIG. 7, can be derived from FIG. 5 by moving the lower stage connected vertices of capacitor edges associated with paths 5PWb1 & 5PWb2 through 5PWn1 & 5PWn2 to be incident at a single vertex, 5VRa, shared by all winding paths. These modifications are presented in FIG. 7. Windings are formed and operated in phase with substantially only DC stress between the windings as described above. Therefore, only switches 7S1a, 7S1b, through 7S1n & 7S2a, 7S2b, through 7S2n conduct in the first mode. Similarly, 7S3a, 7S3b, through 7S3n & 7S4a, 7S4b, through 7S4n conduct in the second mode. Each mode provides one closed winding current path, 7PWxy, where x denotes the associated winding and y denotes the mode. Owing to both the preferred circuit topology and operation of the windings, no valid path exists through more than one winding.

Winding current paths, 7PWxy, in each mode do not change for opposing energy flow. Holding stage capacitor polarity positive (V(7VTa1)>V(7VRa)), energy flow is determined by current direction in each path. The filled arrow, ▶, indicates current direction for processing energy from the windings to the capacitors. Similarly, the unfilled arrow, ▷, indicates current direction for processing energy from the capacitors to the windings. The former is possible using diodes in the switch edges, while transistors are required to perform the latter.

Reduction of the number of locations in which AC stress is present between windings and the return conductors is accomplished by routing all winding return currents through 7VRa rather than through individual returns between stages, as in conventional designs. For instance, during both mode 1 and mode 2, 7VRa is shared by the closed paths 7PWxy.

Figure 8:
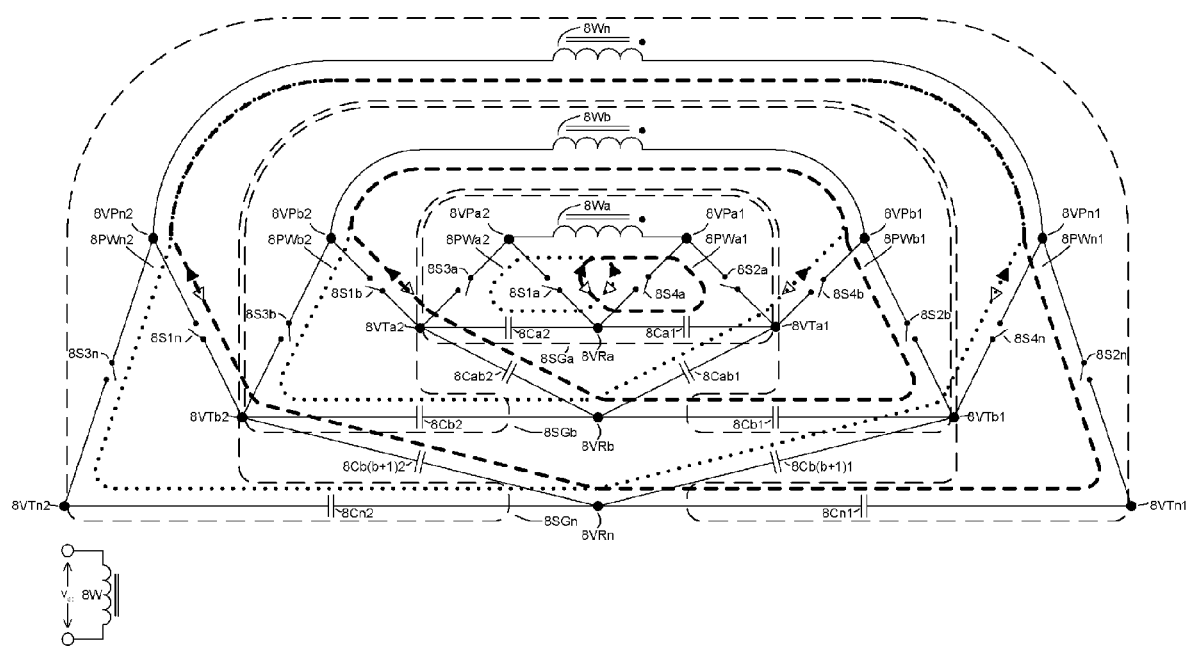
FIG. 8 is a schematic diagram of another embodiment of the present invention.

Still another embodiment of the present invention, illustrated in FIG. 8, can be derived from FIG. 5 by moving the lower stage connected vertices of capacitor edges associated with paths 5PWb1 & 5PWb2 through 5PWn1 & 5PWn2 such that each pair of stage capacitors intersects at its own vertex. Additional capacitor edges are then placed between each new vertex and the vertex from which the stage capacitor was removed. These modifications are presented in FIG. 8. Windings are formed and operated with substantially only DC stress between the windings as described above. Therefore, only switches 8S1a, 8S1b, through 8S1n & 8S2a, 8S2b, through 8S2n conduct in mode 1 and 8S3a, 8S3b, through 8S3n & 8S4a, 8S4b, through 8S4n conduct in mode 2. Closed winding paths PWxy, where x denotes the associated winding and y denotes the mode are illustrated in FIG. 8. For each path illustrated, another nearly identical path exists through three capacitors in series that provide a path parallel to the added capacitor edge. For instance, during mode 1, all winding current in 8Wb must flow through the portion of 8PWb1 that does not include the 8Cab2 edge. However, some portion of the current may flow through the path parallel to 8Cab2 provided by 8Cab1, 8Ca1, and 8Ca2.

Winding current paths, 8PWxy, in each mode do not change for opposing energy flow. Holding stage capacitor polarity positive (V(8VTa1)>V(8VRa)), energy flow is determined by current direction in each path. The filled arrow, ▶, indicates current direction for processing energy from the windings to the capacitors. Similarly, the unfilled arrow, ▷, indicates current direction for processing energy from the capacitors to the windings. The former is possible using diodes in the switch edges, while transistors are required to perform the latter.

In the embodiment of FIG. 8, no path or vertex must be shared by the entire winding currents of two or more windings. However, all closed winding paths, including the paths not shown, contain a vertex that is substantially equal in voltage to at least one vertex in the closed path of another winding. For example, 8VRa, 8VRb, through 8VRn operate at substantially equal voltages. Furthermore, both vertices of windings 8Wb through 8Wn operate at a substantial DC component of voltage relative to their associated return vertices which are at substantially similar voltage relative to at least one vertex comprised by other return paths.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

What is claimed is:

1. A device for transmitting energy, comprising one return vertex and at least a primary winding set and secondary winding sets, wherein each secondary winding set comprises:
   at least one winding;
   at least two diode edge pairs, wherein each pair has a positive diode and a negative diode;
   at least two pole vertices, each pole vertex positioned between the positive diode and the negative diode of each diode edge pair such that each pole vertex has a voltage that may be substantially determined via the positive diode, the negative diode, or both;
   at least two throw vertices, each throw vertex activated by the positive diode, the negative diode, or both to substantially determine the voltage transferred to the pole vertices; and
   at least two capacitors; each connected to one of the throw vertices; wherein there is substantially no AC voltage between secondary winding sets; each secondary winding set shares at least a throw vertex with an adjacent secondary winding set; each secondary winding set closes at least a single closed path which does not include a winding of another secondary winding set, and closes at least a second closed path that includes the at least one return vertex included in the return path of another secondary winding set; throw vertices of each secondary winding set operate at a substantial DC bias relative to the second closed path; and substantially all current related to energy transfer between primary winding sets and secondary passes through a shared portion of the return path.

2. The device according to claim 1, wherein adjacent secondary winding sets are magnetically coupled to one another.

3. The device according to claim 1, wherein each secondary winding set is symmetrical to each other.

4. The device according to claim 1, wherein no conductors are present between secondary winding sets.

5. The device according to claim 1, wherein each secondary winding set has a first mode such that the positive diode of a first diode edge pair is active.

6. The device according to claim 5, wherein two closed paths exist for each secondary winding set during the first mode.

7. The device according to claim 6, wherein each of the two closed paths intersect one of the throw vertices and connect to at least one capacitor.

8. The device according to claim 1, wherein each secondary winding set hasa second mode such that the negative diode of a first diode edge pair is active.

9. The device according to claim 8, wherein two closed paths exist for each secondary winding set during the second mode.

10. The device according to claim 9, wherein each of the two closed paths intersect one of the throw vertices and connect to at least one capacitor.

11. The device according to claim 1, wherein the device comprises single layer planar primary and secondary winding sets.

12. The device according to claim 11, wherein the secondary winding sets are stacked in increments of increasing voltage.

13. The device according to claim 1, wherein the device is arranged in an insulated core transformer.

14. The device according to claim 1, wherein the throw vertices include switches.

15. The device according to claim 1, further comprising an inductor between pole vertices and throw vertices.

16. The device according to claim 1, wherein each closed path within a secondary winding set shares a single vertex with each other secondary winding set.

17. A method of energy transfer between at least a primary winding set and secondary winding sets, comprising:
   substantially eliminating AC voltage between secondary winding sets;
   closing at least a first closed path within each secondary winding set that does not include another secondary winding set;
   operating a winding edge which closes the second closed path for each secondary winding set at a substantial DC bias relative to another secondary winding set; and
   transferring substantially all current responsible for energy transfer between and the secondary winding sets through a segment of path which is either shared with or operates at substantially similar DC voltages as portions of another closed path.

* * * * *